(12) United States Patent
Tosovsky et al.

(10) Patent No.: US 9,453,552 B2
(45) Date of Patent: Sep. 27, 2016

(54) ADAPTIVE THREE PARAMETER ISOLATOR ASSEMBLIES INCLUDING EXTERNAL MAGNETO-RHEOLOGICAL VALVES

(71) Applicant: HONEYWELL INTERNATIONAL INC., Morristown, NJ (US)

(72) Inventors: Jiri Tosovsky, Brno (CZ); Vlastimil Janulik, Uherske Hradiste (CZ); Dale Thomas Ruebsamen, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/330,296

(22) Filed: Jul. 14, 2014

(65) Prior Publication Data
US 2016/0010717 A1 Jan. 14, 2016

(51) Int. Cl.
*F16F 9/53* (2006.01)

(52) U.S. Cl.
CPC ............... *F16F 9/537* (2013.01); *F16F 9/535* (2013.01); *F16F 2230/18* (2013.01)

(58) Field of Classification Search
CPC .......... F16F 9/535; F16F 9/537; F16F 15/03; F16F 9/20; F16D 57/002
USPC ...................................... 188/267.2, 298, 312
See application file for complete search history.

(56) References Cited

U.S. PATENT DOCUMENTS

| | | | | |
|---|---|---|---|---|
| 2,820,471 A * | 1/1958 | Crowell | ................... | F16K 31/02 137/251.1 |
| 5,803,213 A | 9/1998 | Davis et al. | | |
| 6,131,709 A * | 10/2000 | Jolly | ......................... | F16F 9/20 137/909 |
| 6,302,249 B1 * | 10/2001 | Jolly | ..................... | F15B 11/076 188/269 |
| 6,953,108 B2 * | 10/2005 | Anderfaas | ............... | F16F 9/535 188/267.2 |
| 7,051,849 B2 * | 5/2006 | Browne | ................... | F16F 9/535 188/266.4 |
| 7,445,094 B1 * | 11/2008 | Henderson | .............. | F16F 9/535 188/267 |

(Continued)

FOREIGN PATENT DOCUMENTS

| | | |
|---|---|---|
| CN | 203239830 U | 10/2013 |
| EP | 1302693 A2 | 4/2003 |
| KR | 100843158 B1 | 7/2008 |

OTHER PUBLICATIONS

Zhang, X.Z. et al.; Variable Stiffness and Damping MR Isolator; Journal of Physics: Conference Series 149 (2009); 11th Conference on Electrorheological Fluids and Magnetorheological Suspensions, IOP Publishing.

(Continued)

*Primary Examiner* — Thomas Irvin
(74) *Attorney, Agent, or Firm* — Lorenz & Kopf, LLP (57) ABSTRACT

Embodiments of an adaptive three parameter isolator assembly are provided, as are embodiments of a spacecraft isolation system including a plurality of isolator assemblies. In one embodiment, the isolator assembly includes a three parameter isolator having opposing hydraulic chambers configured to be filled with a Magneto-Rheological (MR) damping fluid. An MR valve external to the three parameter isolator is fluidly coupled between the opposing hydraulic chambers. The MR valve is configured to generate a magnetic field through which the MR damping fluid passes as the fluid flows between the opposing hydraulic chambers. A control device is operably coupled to the MR valve and is configured to control the strength of the magnetic field to adjust the viscosity of the MR damping fluid during operation of the three parameter isolator.

10 Claims, 4 Drawing Sheets

(56) References Cited

U.S. PATENT DOCUMENTS

| | | | |
|---|---|---|---|
| 7,874,407 B2 * | 1/2011 | Wereley | F16F 9/3415 188/267 |
| 8,051,823 B2 | 11/2011 | Spaggiari et al. | |
| 8,678,478 B2 * | 3/2014 | Jones | B62D 33/0608 180/89.12 |
| 8,682,528 B2 * | 3/2014 | Contratto | B60N 2/501 340/667 |
| 8,682,539 B2 * | 3/2014 | Jones | B62D 33/0608 188/267.1 |
| 2008/0015753 A1 | 1/2008 | Wereley et al. | |
| 2008/0041676 A1 * | 2/2008 | Pletner | F16F 15/0275 188/267.2 |
| 2010/0152980 A1 * | 6/2010 | Jones | B62D 33/0608 701/49 |

OTHER PUBLICATIONS

Lukianovich, A. et al.; Electrically-controlled adjustable-resistance exercise equipment employing magnetorheological fluid; Center for Intelligent Material Systems and Structures, May 1996.

EP Extended Search Report for Application No. 15174663.3 Dated Dec. 16, 2015.

* cited by examiner

ADAPTIVE THREE PARAMETER ISOLATOR ASSEMBLIES INCLUDING EXTERNAL MAGNETO-RHEOLOGICAL VALVES

TECHNICAL FIELD

The present invention relates generally to vibration isolation devices and, more particularly, to adaptive isolator assemblies including three parameter isolators and external magneto-rheological valves, as well as to vehicle isolation systems employing a plurality of isolator assemblies.

BACKGROUND

Vibration isolation systems are employed in a wide variety of applications to minimize the transmission of disturbances forces between two bodies or structures. For example, satellite are often equipped with vibration isolation systems to minimize the transmission of vibratory forces emitted from attitude adjustment devices (e.g., control moment gyroscopes or reaction wheel arrays) to other vibration-sensitive components (e.g., optical payloads) carried by the satellite. The performance of a vibration isolation system is largely determined by the number of isolators included within the system, the manner in which the isolators are arranged, and the vibration attenuation characteristics of each individual isolator. Vibration isolation systems employing three parameter isolators, which behave mechanically as a primary spring in parallel with a series-coupled secondary spring and damper, provide superior attenuation of high frequency vibratory forces as compared to vibration isolation systems employing other types of passive isolators, such as viscoelastic isolators. An example of a three parameter isolator is the D-STRUT® isolator developed and commercially marketed by Honeywell, Inc., currently headquartered in Morristown, N.J. Such isolators are often passive, single Degree of Freedom (DOF), axially-damping devices well-suited for usage within multi-point mounting arrangements.

While providing the above-noted advantages, passive three parameter isolators remain limited in certain respects. When tuned to provide optimal damping at a frequency corresponding to a targeted critical mode, the three parameter isolator will provide less-than-optimal damping at other operational frequencies and critical modes. This can be disadvantageous in that multiple critical modes can exist over a broad frequency range, the precise frequencies of the critical modes may not be known until after isolator deployment (e.g., satellite launch), and the frequencies at which the critical modes occur can vary over time with changing loads, imbalances, bearing imperfections, and the like. As another limitation, the dynamic stiffness of a conventional three parameter isolator is typically fixed by isolator design and by the viscosity of the selected damping fluid. Thus, a conventional three parameter isolator generally cannot provide both a relatively soft in-orbit stiffness (as is often desired to allow the attenuation of low amplitude vibrations), while also providing a relatively high on-launch stiffness (as may be desired to decrease the likelihood of fluid leakage when the isolator is subject to high impact loads during satellite launch).

It is thus desirable to provide embodiments of a three parameter isolator or isolator assembly that overcomes the limitations associated with conventional passive three parameter isolators of the type described above. In particular, it would be desirable to provide three parameter isolator assemblies that enable the damping and stiffness characteristics of the isolator assembly to be actively tuned during usage of the isolator assembly; e.g., by way of non-limiting example only, it may be desirable to provide an isolator assembly enabling adaptive tuning of damping/stiffness properties during on-launch and in-orbit operation of the isolator assembly when deployed onboard a spacecraft. It would also be desirable to provide embodiments of a vehicle isolation system employing one or more three parameter isolator assemblies providing such in-field tuning. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of an adaptive three parameter isolator assembly are provided. In one embodiment, the isolator assembly includes a three parameter isolator having opposing hydraulic chambers configured to be filled with a Magneto-Rheological (MR) damping fluid. An MR valve is externally positioned with respect to the three parameter isolator and is fluidly coupled between the opposing hydraulic chambers. The MR valve is configured to generate a magnetic field through which the MR damping fluid passes as the fluid flows between the opposing hydraulic chambers. A general control device is operably coupled to the MR valve and is configured to control the strength of the magnetic field to adjust the viscosity of the MR damping fluid during operation of the three parameter isolator.

Vehicle isolation systems are also provided for minimizing the transmission of vibrations between a vehicle and a payload carried by the vehicle. The vehicle can be a spacecraft, a motor vehicle, an aircraft, a watercraft, or the like, to list but a few examples. In one embodiment, the vehicle isolation system includes a plurality of three parameter isolator assemblies and mounting hardware, which is coupled to the isolator assemblies and configured to mount the isolator assemblies to the vehicle. Each isolator assembly includes a three parameter isolator having opposing hydraulic chambers configured to be filled with a Magneto-Rheological (MR) damping fluid. An MR valve is externally positioned with respect to the three parameter isolator and fluidly coupled between the opposing hydraulic chambers. The MR valve is configured to generate a magnetic field through which the MR damping fluid passes when flowing between the hydraulic chambers. A control device is operably coupled to the MR valve and is configured to control the strength of the magnetic field to adjust the viscosity of the MR damping fluid during operation of the vehicle isolation system.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The term "adaptive," as appearing herein, is utilized to distinguish over "passive" vibration isolators and other isolation systems. The term "adaptive" thus encompasses both "active" and "semi-active" isolator assemblies and isolation systems. The adaptive isolator assemblies described herein are usefully employed in vehicle isolation systems utilized to attenuate vibrations or impact forces transmitted between a vehicle and a payload carried by the vehicle. It is emphasized, however, that the below-described three parameter isolator assemblies (and multi-point isolation systems employing the isolator assemblies) can be utilized in any spaceborne, airborne, terrestrial, or other application wherein it is desired to attenuate vibrations or impact loads between two objects or structures. An example of a multi-point vehicle isolation system including a number of isolator assemblies is described more fully below in conjunction with FIG. 5.

Figure 1:
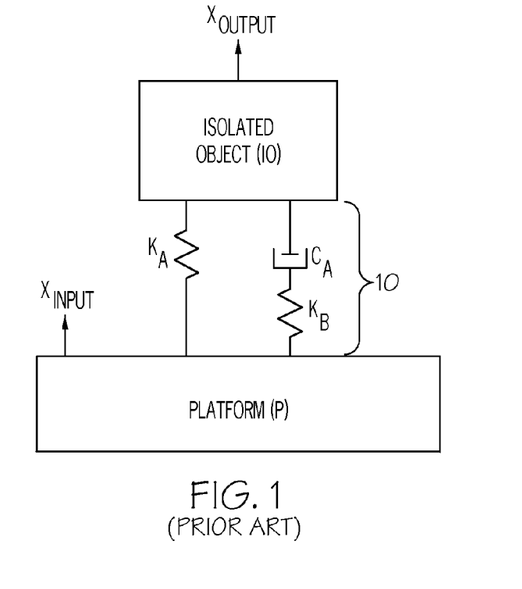
FIG. 1 is a schematic of a passive three parameter vibration isolator disposed between two structures and illustrated in accordance with the teachings of prior art.

FIG. 1 is a schematic representation of a passive three parameter isolator 10, as illustrated in accordance with the teachings of prior art. Three parameter isolator 10 is mechanically coupled between an isolated object "IO" and a platform "P." In one embodiment, platform P is a satellite or other spacecraft, while isolated object IO is an optical bench or other vibration-sensitive payload carried by the spacecraft. In another embodiment, platform P is an aircraft and isolated object IO is a gas turbine engine, which generates vibrations that are desirably attenuated prior to reaching the aircraft fuselage. In still further embodiments, platform P can be a different type of vehicle. As modeled in FIG. 1, three parameter isolator 10 includes the following mechanical elements or components: (i) a first spring component $K_A$, which is mechanically coupled between isolated object IO and platform P; (ii) a second spring component $K_B$, which is mechanically coupled between isolated object IO and platform P in parallel with first spring component $K_A$; and (iii) a damper $C_A$, which is mechanically coupled between isolated object IO and platform P in parallel with the first spring component $K_A$ and in series with the second spring component $K_B$. Transmissibility of three parameter isolator 10 is expressed by the following equation:

$$T(\omega) = \frac{X_{output}(\omega)}{X_{input}(\omega)} \quad \text{EQ. 1}$$

wherein $T(\omega)$ is transmissibility, $X_{output}(\omega)$ is the output motion of isolated object IO, and $X_{input}(\omega)$ is the input motion imparted to isolator 10 by platform P.

Figure 2:
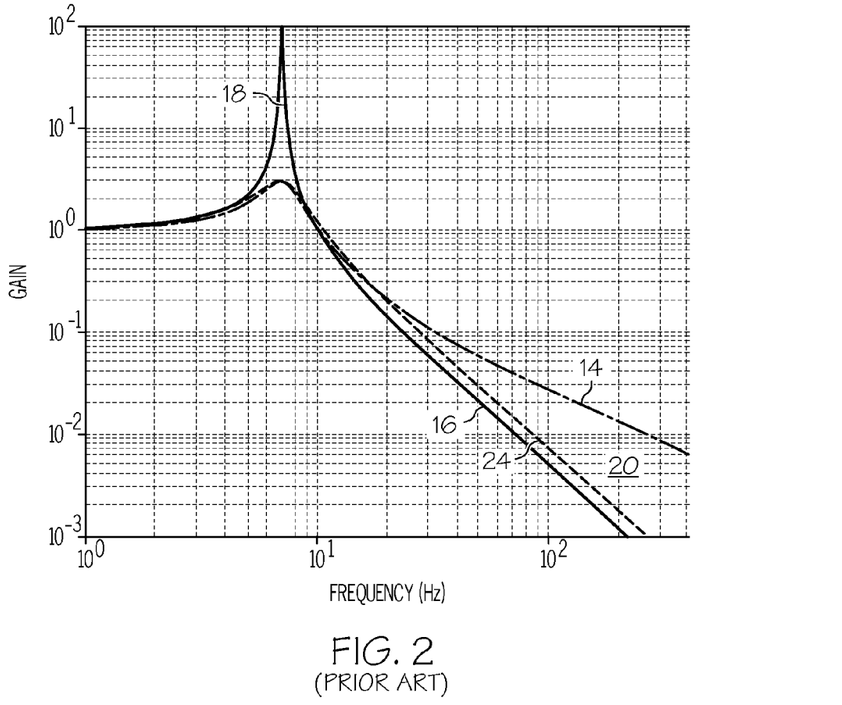
FIG. 2 is a transmissibility plot of frequency (horizontal axis) versus gain (vertical axis) illustrating the transmissibility profile of the three parameter isolator shown in FIG. 1 as compared to the transmissibility profiles of a two parameter isolator and an undamped device.

FIG. 2 is a transmissibility plot illustrating the damping characteristics of three parameter isolator 10 (curve 12) as compared to a two parameter isolator (curve 14) and an undamped device (curve 16). As indicated in FIG. 2 at 18, the undamped device (curve 16) provides a relatively high peak gain at a threshold frequency, which, in the illustrated example, is moderately less than 10 hertz. By comparison, the two parameter device (curve 14) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 14) is approximately 20 decibel per decade ("dB/decade"). Lastly, the three parameter device (curve 12) provides a low peak gain substantially equivalent to that achieved by the two parameter device (curve 14) and further provides a relatively steep roll-off of about 40 dB/decade. The three parameter device (curve 12) thus provides a significantly lower transmissibility at higher frequencies, as quantified in FIG. 2 by the area 20 bounded by curves 12 and 14. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application and are hereby incorporated by reference.

It should thus be appreciated that a passive three parameter isolator, such as isolator 10 schematically illustrated in FIG. 1, can be tuned to provide superior damping characteristics (i.e., a lower overall transmissibility) as compared to undamped devices and two parameter devices over a given frequency range. Furthermore, in contrast to viscoelastic dampers, the stiffness and damping characteristics of passive three parameter isolators are independently tunable. Consequently, when six or more isolators are arranged in a multi-point system, each three parameter isolator can be specifically tuned to provide optimal stiffness and damping in each degree of freedom to minimize vibration transmittance between a platform and an isolated object supported thereby. However, as noted in the foregoing section entitled "BACKGROUND," passive three parameter isolators remain limited in certain respects. For example, while a three parameter isolator can be tuned to provide peak damping at a frequency corresponding to a targeted critical mode, the passive three parameter isolator will then provide less-than-optimal damping at other operational frequencies at which other critical or rigid body modes occur. This can be disadvantageous in that the precise frequencies at which the critical modes occur may not be known until after isolator deployment (e.g., after spacecraft launch) and may vary over time. As a further limitation, the dynamic stiffness of a passive three parameter isolator is typically fixed and, thus, cannot be adjusted during isolator operation to accommodate isolator operation in highly disparate environments, such as on-launch and in-orbit environments.

The following describes adaptive three parameter isolator assemblies, which overcome the aforementioned limitations associated with conventional passive three parameter isolators. The below-described isolator assemblies employ external magneto-rheological ("MR") valves, which are fluidly coupled to the hydraulic chambers of a three parameter isolator. The isolator's hydraulic chambers are filled with an MR damping fluid, which passes through the MR valve as the fluid flows between the hydraulic chambers. A general control device varies the strength of a magnetic field generated by the MR valve to modify the viscosity of the MR damping fluid when flowing between the hydraulic chambers. The control device can modify the viscosity of the MR damping fluid to adjust the dynamic stiffness of the three parameter isolator. Additionally or alternatively, the control device can modify damping fluid viscosity to alter the damping coefficient ($C_A$) of the three parameter isolator and thereby actively tune the frequency at which the isolator provides peak damping. In this latter case, the control device can modify the damping fluid viscosity in response to input data, such as the magnitude of vibratory forces detected by one or more vibration sensors included within the assembly. In so doing, the isolator assembly automatically or adaptively self-tunes its damping capabilities to target critical modes as they develop and change over time. As a still further example, the control device may modify the damping fluid viscosity in response to temperature measurements to offset thermally-induced changes in damping fluid volume. This, in turn, may eliminate the need for a thermal compensator of the type commonly included within three parameter isolators. An example of such an adaptive three parameter isolator assembly will now be described in conjunction with FIG. 3.

Figure 3:
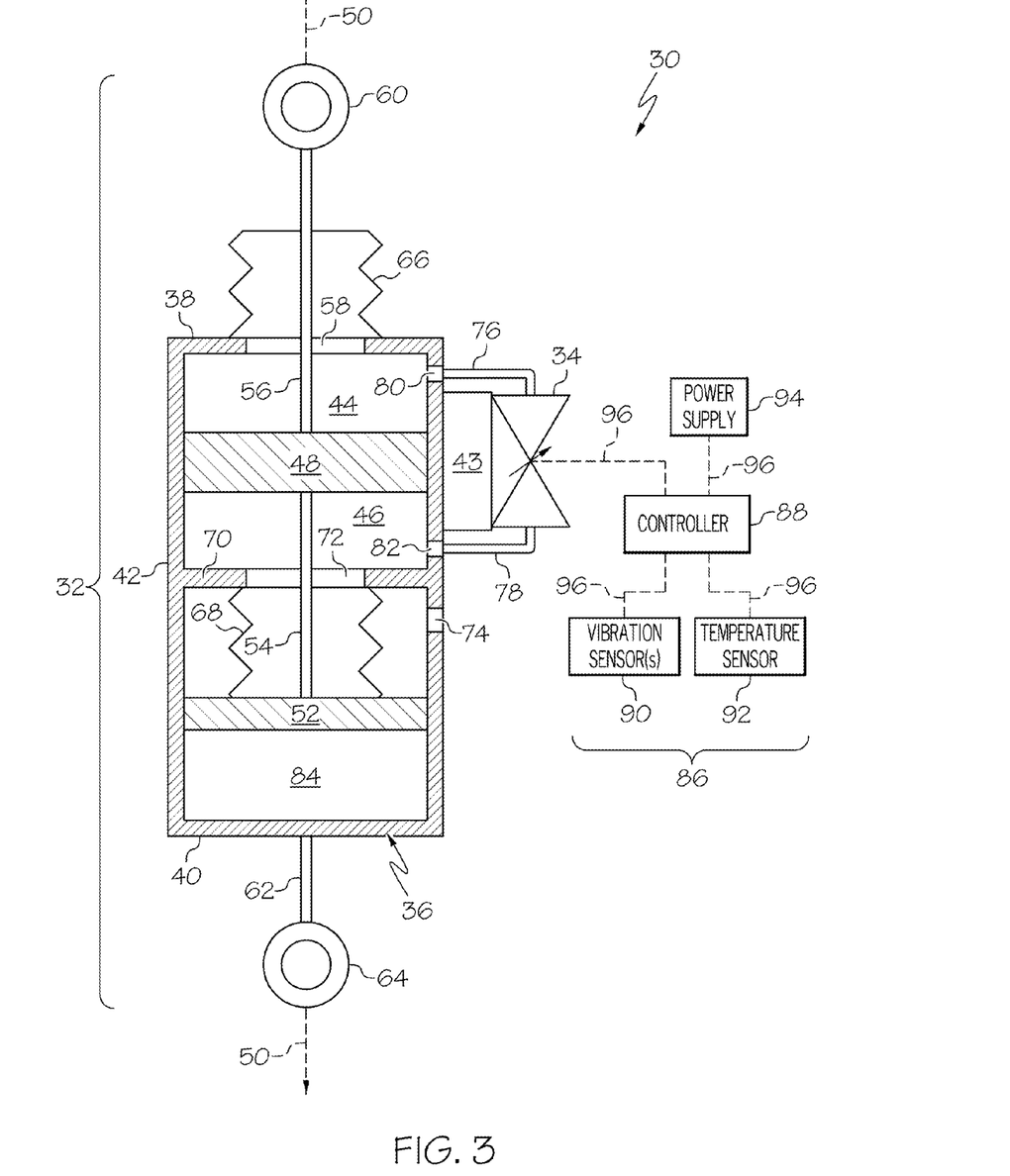
FIG. 3 is a schematic of an adaptive three parameter isolator assembly including a three parameter isolator and a magneto-rheological valve, which is external to the isolator and fluidly interconnected therewith, as illustrated in accordance with an exemplary embodiment of the present invention.

FIG. 3 is a schematic representation of an adaptive three parameter isolator assembly 30, as illustrated in accordance with an exemplary embodiment of the present invention. Isolator assembly 30 includes a three parameter isolator 32 and an MR valve 34, which is positioned external to and which is fluidly coupled to isolator 32. In certain respects, three parameter isolator 32 is similar to other known three parameter isolators, such as those described in U.S. Pat. No. 5,803,213, entitled "HEAVY LOAD VIBRATION ISOLATION APPARATUS," issued Sep. 8, 1998, assigned to assignee of the instant application and incorporated by reference. However, such isolators are typically passive in nature and do not cooperate with an external MR valve and control system to provide active or adaptive adjustments in stiffness and damping by manipulating the viscosity of an MR damping fluid in the manner described below. Furthermore, as a point of emphasis, that the particular design of three parameter isolator 32 can vary amongst embodiments providing that: (i) isolator 32 is a three parameter device having at least two hydraulic chambers fillable with an MR damping fluid, and (ii) the hydraulic chambers of isolator 32 are fluidly coupled to an external MR valve such that the MR damping fluid is routed through the MR valve when flowing between the hydraulic chambers. With this in mind, the embodiment of three parameter isolator 32 schematically shown in FIG. 3 will now be described in detail to provide an exemplary, albeit non-limiting context in which the operation of three parameter isolator assembly 30 can be better understood.

As schematically illustrated in FIG. 3, three parameter isolator 32 includes an isolator housing 36 having a first end portion 38, a second end portion 40 opposite end portion 38, and an intermediate portion 42 between end portions 38 and 40. For ease of reference, housing end portions 38 and 40 may be respectively referred to as "upper" and "lower" end portions hereafter, and similar terminology may be used to describe the other structural component of three parameter isolator 32. Such terms are utilized in reference to the illustrated orientation of three parameter isolator 32 shown in FIG. 3 and with the understanding that isolator 32 can assume any orientation in three dimensional space. Isolator housing 36 can be produced from any number of pieces suitable for containing opposing hydraulic chambers and one or more translating pistons (e.g., pistons 48 and 52 described below). In one embodiment, and by way of non-limiting example only, housing 36 is produced from a cylinder to which one or more end caps are sealingly joined by threaded attachment, by circumferential welding, or utilizing another joinder technique suitable for forming a liquid-tight seal. In many embodiments, isolator housing 36 will have a generally tubular geometry and contain at least one inner cavity or bore in which a damper piston is slidably mounted for translational movement along the working axis of isolator 32, as described more fully below. As indicated in FIG. 3, isolator housing 36 can include an external valve mounting interface 43 to which MR valve 34 is mounted.

Variable-volume, opposing hydraulic chambers 44 and 46 are contained within housing 36. A damper piston 48 is slidably mounted within an upper portion of isolator housing 36 and fluidly partitions hydraulic chambers 44 and 46. Damper piston 48 can slide within isolator housing 36 along the working axis of isolator 32 (represented in FIG. 3 by dashed line 50). A gas spring piston 52 is also slidably mounted within a lower portion of housing 36 for translational movement along working axis 50. Damper piston 48 and gas spring piston 52 are rigidly joined by an internal shaft or connecting rod 54, which extends within lower hydraulic chamber 46. As a result of this rigid coupling, pistons 48 and 52 stroke in unison along working axis 50 during operation of isolator 32. Pistons 48 and 52 each sealingly engage an inner circumferential surface of housing 36. In this regard, pistons 48 and 52 may each be fabricated to have an outer diameter slightly less than the inner diameter of housing 36 to provide a close tolerance fit, while allowing pistons 48 and 52 to slide axially therein. If desired, pistons 48 and 52 may also each be equipped with a dynamic seal (not shown), such as an O-ring, to sealingly engage the inner surfaces of housing 36 and thereby minimize or eliminate fluid leakage across the respective piston-bore interfaces.

A through-shaft 56 extends into upper hydraulic chamber 44 through an opening 58 provided in upper end portion 38 of isolator housing 36. The inner terminal end of through-shaft 56 may be affixed to damper piston 48 utilizing, for example, a threaded interface or other attachment interface. Alternatively, through-shaft 56 and damper piston 48 can be produced as a single, machined piece. The outer terminal end of through-shaft 56 serves a first mechanical input/output of three parameter isolator 32 and is affixed to a first pivot coupling 60, as schematically illustrated in FIG. 3. A lower shaft or "stinger" 62 is further rigidly joined to and extends axially from lower end portion 40 of housing 36. Stinger 62 serves as a second mechanical input/output of isolator 32. Stinger 62 can likewise terminate in a lower pivot coupling 64. Collectively, pivot couplings 60 and 64 permit additional freedom of movement of three parameter isolator 32 during installation of three parameter isolator 32 and/or as pistons 48 and 52 stroke along working axis 50 of isolator 32. In further embodiments, three parameter isolator 32 can be produced to include a different type of mounting interface, such as a fixed-point mounting interface or a spherical bearing mounting interface. Additionally, in certain embodiments, one or more mounting features can be integrated directly into lower end portion 40 of isolator housing 36, in which case stinger 62 may be eliminated.

Hydraulic chambers 44 and 46 are hermetically sealed or, at minimum, fluid-tight to prevent the leakage of damping fluid during operation of isolator 32. Hydraulic chambers 44 and 46 are sealed in such a manner to permit translational movement of damper piston 48, gas spring piston 52, connecting rod 54, and through-shaft 56. This can be accomplished utilizing a system of sliding interfaces and dynamic seals. Alternatively, as indicated in FIG. 3, a first metal sealing bellows 66 can be sealingly joined between upper end portion 38 of housing 26 and through-shaft 56 to seal the upper end portion of hydraulic chamber 44, while permitting translational movement of through-shaft 56. Bellows 66 is internally-pressurized and, along with damper piston 48 and an interior surface of isolator housing 36, bounds upper hydraulic chamber 44. A second metal sealing bellows 68 is likewise sealingly joined between an inner circumferential wall 70 provided within housing 36 and a first face of gas spring piston 52. An opening 72 is provided in inner wall 70 through which connecting rod 54 extends to join pistons 48 and 52. Bellows 68 is thus also internally-pressurized and cooperates with the first face of piston 52; a first face of damper piston 48 (opposite the face of piston 48 bounding chamber 46); and the interior surface of housing 36 to bound or define hydraulic chamber 46. A void or open space surrounds the exterior of sealing bellows 68, and a vent hole 74 can be provided in the sidewall of housing 36 to prevent trapping a volume of air, which could otherwise impact the deflection of bellows 68.

Hydraulic chambers 44 and 46 are fluidly coupled by a flow path extending through MR valve 34. Specifically, in the exemplary embodiment shown in FIG. 3, upper hydraulic chamber 44 is fluidly coupled to a first port of MR valve 34 by a first conduit 76, while lower hydraulic chamber 46 is fluidly coupled to a second port of MR valve 34 by a second conduit 78. Sidewall ports 80 and 82 are provided in isolator housing 36 and fluidly coupled to conduits 76 and 78, respectively, to facilitate the desired fluid interconnections. Hydraulic chambers 44 and 46, conduits 76 and 78, and MR valve 34 contain and conduct a selected MR damping fluid during operation of isolator assembly 30, as described below. The MR damping fluid can be any liquid, which is suitable for damping purposes and which has a viscosity that varies in relation to the magnitude of an externally-generated magnetic field. Isolator assembly 30 may initially be produced and distributed without damping fluid, in which case hydraulic chambers 44 and 46 (and conduit 76, conduit 78, and MR valve 34) may be filled with a selected damping fluid at a chosen juncture after production and prior to usage of assembly 30. Filling of the various chambers and flow passages of isolator assembly 30 may be accomplished utilizing a non-illustrated fill port, which is sealed after damping fluid filling.

As noted above, damper piston 48, gas spring piston 52, through-shaft 56, and connecting rod 54 translate with respect to housing 36 during operation of isolator 32. As damper piston 48 slides within housing 36, the MR damping fluid is exchanged between hydraulic chambers 44 and 46, which vary in respective volumes depending upon the translational position of piston 48. In instances wherein movement of damper piston 48 results in a decrease in the volume of hydraulic chamber 44 and a corresponding increase in the volume of hydraulic chamber 46 (that is, when damper piston 48 strokes upward in the illustrated orientation shown in FIG. 3), damping fluid flows from chamber 44, through flow passage 76, through MR valve 34, through flow passage 78, and to chamber 46. Conversely, in instances wherein the movement of damper piston 48 results in an increase in the volume of hydraulic chamber 44 and a decrease in the volume of hydraulic chamber 46 (when damper piston 48 strokes downward in the illustrated orientation), damping fluid flows from chamber 46, through flow passages 78, through MR valve 34, through flow passage 76, and to chamber 44. When passing between chambers 44 and 46, the MR damping fluid is forced through at least one restricted flow path or orifice to provide the desired damping effect. In the embodiment schematically shown in FIG. 3, the restricted flow path is produced by a combination of sidewall ports 80 and 82, flow passages 76 and 78, and MR valve 34. Hydraulic cambers 44 and 46, damper piston 48, and the damping fluid thus collectively form a damper 44, 46, 48 having a damping coefficient $C_A$.

Three parameter isolator 32 further includes a main spring, which is mechanically coupled in parallel with damper 44, 46, 48. In certain embodiments, the main spring can be a discrete coil spring or a machined spring cut into housing 36. In the illustrated example, the main spring is a gas spring 52, 84 collectively formed by gas spring piston 52 and a pneumatic chamber 84 provided in a lower portion of housing 36. As shown in FIG. 3, pneumatic chamber 84 is bound by the interior surface of housing 36 and the lower face of gas spring piston 52 opposite the upper of piston 52, which partially bounds lower hydraulic chamber 46. Two load paths are thus provided through isolator 32: (i) a first load path extending from upper pivot coupling 60; through through-shaft 56; through damper 44, 46, 48; through housing 36; and to lower pivot coupling 64; and (ii) a second load path extending from upper pivot coupling 60; through through-shaft 56; through connecting rod 54; through gas spring 52, 84; and to lower pivot coupling 64. Isolator 32 is thus properly considered a three parameter device wherein $C_A$ (the damping coefficient) is determined by damper 44, 46, 48 and the viscosity of the selected MR damping fluid. The spring constant $K_A$ is primarily determined by gas spring 52, 84. Finally, the tuning spring constant $K_B$ is primarily determined by the volumetric stiffness through damper 44, 46, 48 when filled with the selected damping fluid. While not provided in the embodiment shown in FIG. 3, a discrete tuning spring (e.g., a coil, machined, or gas spring) can be provided in series with damper 44, 46, 48 and in parallel with main gas spring 52, 84 to enable additional tuning of the $K_B$ value in further embodiments of isolator 32.

During operation of three parameter isolator assembly 30, MR valve 34 generates a magnetic field through which the MR damping fluid passes when flowing between opposing hydraulic chambers 44 and 46 of isolator 32. Isolator assembly 30 further includes a control sub-system 86, which functions to control the strength of the magnetic field generated by MR valve 34, the viscosity of the MR damping fluid, and therefore the dynamic stiffness and damping properties of isolator 32. As shown in FIG. 3, control sub-system 86 can include a general control device 88, one or more vibration sensors 90, a temperature sensor 92, and a power supply 94. The various interconnections between the components of control sub-system 86 and MR valve 34 are represented in FIG. 3 by dashed lines 96. As indicated, control device 88 is operably coupled to MR valve 34 and, specifically, electrically coupled to one or more induction coils contained within valve 34 (described below). Vibration sensor 90, temperature sensor 92, and power supply 94 are further coupled to control device 88. These connections will typically be hard or wired; however, the possibility that sensor 90 and/or sensor 92 may communicate wirelessly with control device 88 is by no means precluded. Control device 88 causes MR valve 34 to vary the strength of the magnetic field generated thereby. Control device 88 will typically (but need not always) adjust the strength of the magnetic field generated by valve 34 by varying the current supplied to or voltage applied across valve 34 by power supply 94. Control device 88 can be manual, electrical, or mechanical in nature, or a combination thereof. When at least partially implemented electronically, control device 88 can include any number of interconnected hardware (e.g., processors and memories), software, and firmware components suitable for performing the above-described functions.

Control device 88 can be programmed or otherwise configured to adjust the strength of the magnetic field generated by valve 34 in accordance with a predetermined schedule stored in a memory associated with control device 88. For example, when isolator assembly 30 is deployed onboard a satellite, control device 88 can command MR valve 34 to increase the strength of the magnetic field generated by valve 34 during satellite launch and then lessen the magnetic field strength when the satellite is on-orbit. In this case, control device 88 may be operable in at least the following modes: (i) in a spacecraft launch mode during which control device 88 adjusts the magnetic field to increase the dynamic stiffness of isolator 32, and (ii) and on-orbit mode during which control device 88 decreases the strength of the magnetic field and the stiffness of isolator 32. In this manner, the dynamic stiffness of three parameter isolator 32 can be boosted during launch to protect isolator 32 from damage and then subsequently decreased during on-orbit operation to soften isolator 32 for improved response to low amplitude vibrations. In further embodiments, control device 88 can manipulate the strength of the magnetic field generated by MR valve 34 in response to commands received from an external control source and, perhaps, received via a wireless transceiver (not shown).

Control device 88 can further adjust the strength of the magnetic field generated by MR valve 34 in a reactive or semi-active manner and, specifically, in response to measured operational characteristics pertaining to isolator assembly 30. In one implementation, control device 88 is configured to adjust the strength of the magnetic field generated by MR valve 34 in response to data received by vibration sensors 90. Vibration sensors 90 can be, for example, one or more single-axis or dual-axis accelerometers, which may be mounted to isolator 32, to a platform (e.g., platform P shown in FIG. 5), or to an isolated object (e.g., isolated IO shown in FIG. 5). Control device 88 can be configured to increase or decrease MR fluid viscosity, as appropriate, to maintain the amplitudes of vibratory forces measured by sensors 90 below a predetermined threshold. In this manner, control device 88 can control MR valve 34 to continually adjust the damping properties of three parameter isolator 32 and thereby target multiple critical modes occurring across the entire operational frequency range of isolator 32. Furthermore, control device 88 can control MR valve 34 to adapt to any frequency drift of the critical modes that may occur the operational lifespan of isolator assembly 30. In addition to or as an alternative to adjusting magnetic field strength as a function of detected vibrations, control device 88 can adjust the strength of the magnetic field generated by MR valve 34 in response to data received from temperature sensor 92 to, for example, compensate for changes in thermally-induced changes in damping fluid volume. Specifically, as the temperature recorded by sensor 92 increases, control device 88 can control MR valve 34 to offset the decreasing viscosity of the MR damping fluid.

It should thus be appreciated that isolator assembly 30 enables adaptive adjustments in MR damping fluid viscosity to allow the stiffness and damping characteristics of three parameter isolator 32 to be tuned in-field. The desired changes in MR damping fluid viscosity are achieved by modifying the strength of the magnetic filed generated by MR valve 34. Notably, it may be unnecessary to energize MR valve 34 during certain intervals of operation if the natural or inherent viscosity of the MR damping fluid when not exposed to an artificially-generated magnetic field is adequate to impart MR valve 34 with its desired damping and stiffness characteristics. Furthermore, as MR valve 34 is external or exterior to isolator 32 (as opposed to being integrated therein), sealing of power cables is avoided, the design complexity of the spring/damper element of isolator 32 is favorably reduced, and removal and disassembly of MR valve 34 is facilitated. Additionally, the need to redesign the spring/damper element of isolator 32 is eliminated if, for example, it should become necessary to increase the size or number of the inductor coils included within valve 34. MR valve 34 can assume any form suitable for generating a magnetic field through which the MR damping fluid passes when flowing between hydraulic chambers 44 and 46 of isolator 32. It is preferred, however, that MR valve 34 lacks a valve element or any other moving parts such that isolator assembly 30 will remain functional in the event of MR valve failure. An example of an MR valve lacking moving parts and suitable for usage as MR valve 34 will now be described in conjunction with FIG. 4.

Figure 4:
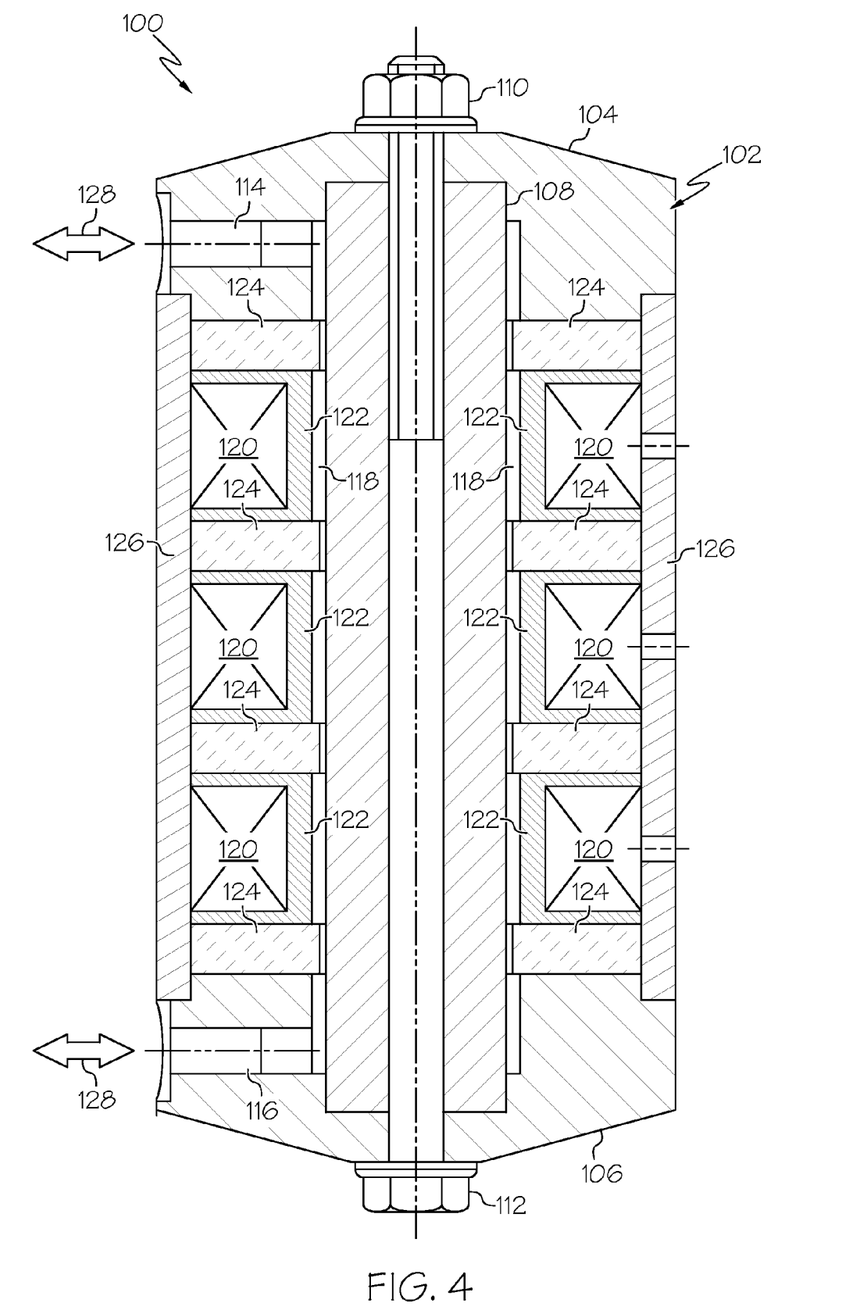
FIG. 4 is a cross-sectional view of an exemplary magneto-rheological valve suitable for usage as the magneto-rheological valve shown in FIG. 3.

FIG. 4 is a cross-sectional view of a three stage reversible MR valve 100 suitable for usage as MR valve 34 shown in FIG. 3. In this example, MR valve 100 includes a valve housing 102 having first and second end caps 104 and 106. End caps 104 and 106 are joined to opposing ends of a cylindrical core 108 utilizing, for example, a threaded rod and associated fasteners 110 and 112. Ports 114 and 116 are provided in end caps 104 and 106, respectively. A generally annular or tubular flow passage 118 extends around core 108 and between ports 114 and 116. Flow passage 118 is surrounded by a number of inductor coils 120 wound around paramagnetic holders 122 and interspersed with ferrite rings 124. A shroud 126 surrounds this assembly, and non-illustrated leads are provided through shroud 126 to coils 120. When utilized as MR valve 34 shown in FIG. 3, port 114 can be fluidly coupled to conduit 76, port 116 can be fluidly coupled to conduit 78, and coils 120 can be electrically coupled to control device 88. As pistons 48 and 52 stroke in response to vibratory forces applied across isolator 32 (FIG. 3), MR damping fluid flows between opposing hydraulic chambers 44 and 46 and through MR valve 100 (FIG. 4). Control device 88 can thus vary the current supplied to coils 120 to increase or decrease the strength of the magnetic field generated thereby so as to adjust the viscosity of the MR damping fluid as it passes through valve 100. This, in turn, enables control device 88 to adjust the stiffness and damping properties of three parameter isolator 32 (FIG. 3), as previously described. Notably, MR valve 100 lacks a valve element or any other moving parts. As a result, MR damping fluid is still permitted flow through valve 100 and isolator assembly 30 remains operational in the unlikely event of MR valve failure.

Figure 5:
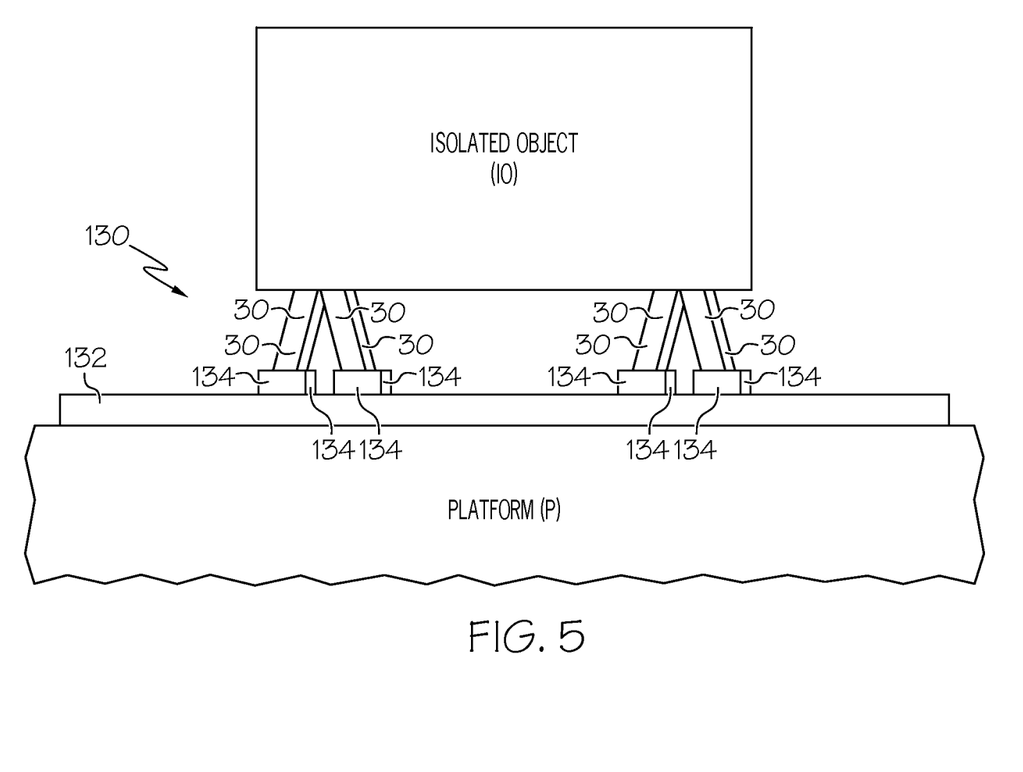
FIG. 5 is simplified schematic illustrating one manner in which the isolator assembly shown in FIG. 3 can be combined with a number of like isolator assemblies to produce a multi-point isolation system, which can be deployed onboard a vehicle, as illustrated in accordance with a further exemplary embodiment of the present invention.

FIG. 5 is simplified schematic illustrating one manner in which isolator assembly 30 (FIG. 3) can be combined with a number of like isolators (also identified by reference numerals "30") to produce an isolation system 130, as illustrated in accordance with a further exemplary embodiment of the present invention. Isolation system 130 is deployed between a platform P and an isolated object IO in a multi-point mounting arrangement. As generically illustrated in FIG. 5, the opposing ends of isolator assemblies 30 (in particular, the opposing ends of the isolators included within assemblies) are mounted to a platform mounting interface 132 utilizing mounting hardware, such as a plurality of mounting brackets 134. In this particular example, isolation system 130 includes eight isolator assemblies 30, which are positioned in an octopod mounting arrangement to provide high fidelity damping in six degrees of freedom ("6-DOF"). In further embodiments, isolation system 130 may include a lesser number or a greater number of isolator assemblies, which may be positioned in other mounting arrangements. For example, in an alternative embodiment, isolation system 130 may include six isolator assemblies 30 positioned in a hexapod or Stewart platform-type mounting arrangement.

Platform P and isolated object IO can assume various different forms, depending upon the particular application in which isolation system 130 is employed. In certain embodiments, platform P may assume the form of a spacecraft; while isolated object IO assumes the form of a vibration-sensitive component, such as an optical payload or sensor suite, carried-by the spacecraft. In this case, isolation system 130 may serve to minimize the transmission of vibrations from a vibration-emitting source aboard the spacecraft, through mounting interface 132, and to the vibration-sensitive component when the spacecraft is in orbit. Similarly, isolation system 130 may serve to minimize the transmission of impact forces through mounting interface 132 and to the vibration-sensitive component during spacecraft launch. In other embodiments, platform P can be a different type of vehicle, such as an aircraft. Each isolator assembly can be commanded to or may automatically tune itself to provide high damping of rigid body modes of platform P and an isolated object IO during operation of isolation system 130. Vibration isolation system 130 can thus provide high fidelity damping performance over the entire dynamic operating range (static to very high frequency) of platform P and an isolated object IO. At the same time, the dynamic stiffness of isolator assemblies 30 can be automatically increased in the presence of high impact loads (e.g., during spacecraft launch in embodiments wherein platform P is a satellite or other spacecraft) to protect assemblies 30 from fluid leakage or other damage. While shown as discrete units in FIG. 5, it will be appreciated that certain components of isolator assemblies 30 can be combined to reduce part count in at least some embodiments. For example, two or more of isolator assemblies 30 can share a common power source, a common control device, a common temperature sensor (if present), and/or a common vibration sensor (if present).

There has thus been provided embodiments of an adaptive three parameter isolator assemblies, which overcome certain limitations associated with conventional passive three parameter isolators. In the above-described embodiments, the isolator assemblies included MR valves enabling the viscosity of an MR damping fluid to be controlled as the damping fluid passes between the hydraulic chambers of a three parameter isolator. This, in turn, allows the stiffness and damping characteristics of the three parameter isolator to be tuned in-field in response to a preset schedule, to commands received from an external control source, or to measured operational characteristics (e.g., temperature and/or vibration measurements) of the isolator assembly. In this manner, the isolator assembly can independently tune itself on-orbit to continually target one or more critical modes as they develop and change over time. Additionally, the isolator assembly can be configured to adjust damping fluid viscosity to compensate for thermally-induced changes in damping fluid volume. The foregoing also provided embodiments of a spacecraft isolation system including a plurality of three parameter isolator assemblies.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An adaptive three parameter isolator assembly, comprising:
   a three parameter isolator, comprising:
      opposing hydraulic chambers configured to be filled with a Magneto-Rheological (MR) damping fluid; and
      at least one metal sealing bellows partially enclosing at least one of the opposing hydraulic chambers;
   an MR valve external to the three parameter isolator and fluidly coupled between the opposing hydraulic chambers, the MR valve configured to generate a magnetic field through which the MR damping fluid passes when flowing between the opposing hydraulic chambers;
   a control device operably coupled to the MR valve and configured to control the strength of the magnetic field to adjust the viscosity of the MR damping fluid during operation of the three parameter isolator; and
   a vibration sensor coupled to the control device, the control device further configured to control the MR valve to adjust the MR damping fluid viscosity to maintain the magnitude of vibratory forces measured by the vibration sensor below a predetermined threshold.

2. The adaptive three parameter isolator assembly of claim 1 wherein the MR valve includes first and second ports, and wherein the three parameter isolator comprises first and second conduits fluidly coupling the opposing hydraulic chambers to the first and second ports of the MR valve, respectively.

3. The adaptive three parameter isolator assembly of claim 1 wherein the MR valve is configured such that MR fluid flow is still permitted between the opposing hydraulic chambers in the event of MR valve failure.

4. The adaptive three parameter isolator assembly of claim 1 further comprising a temperature sensor operably coupled to the control device, the control device configured to control the MR valve to increase the strength of the magnetic field within increasing temperature to offset temperature-induced fluctuations in MR damping fluid viscosity.

5. The adaptive three parameter isolator assembly of claim 1 wherein the control device is operable in a spacecraft launch mode and in an in-orbit mode, and wherein the control device adjusts the magnetic field to increase the dynamic stiffness of the three parameter isolator when operating in the spacecraft launch mode relative to the dynamic stiffness of the three parameter isolator when operating in the in-orbit mode.

6. The adaptive three parameter isolator assembly of claim 1 wherein the three parameter isolator comprises:
   an isolator housing;
   a damper piston disposed within the isolator housing and slidable along a working axis; and
   a gas spring piston disposed within the isolator housing and slidable along the working axis.

7. The adaptive three parameter isolator assembly of claim 6 wherein the three parameter isolator comprises first and second sidewall ports formed in the isolator housing and fluidly coupled to the MR valve.

8. The adaptive three parameter isolator assembly of claim 6 wherein the MR valve is mounted to the exterior of the isolator housing.

9. The adaptive three parameter isolator assembly of claim 6 wherein the three parameter isolator further comprises a connecting rod fixedly coupling the damper piston to the gas spring piston such that the damper piston and the gas spring piston stroke in unison along the working axis.

10. The adaptive three parameter isolator assembly of claim 6 wherein the three parameter isolator further comprises a pneumatic chamber within the isolator housing and partitioned from the opposing hydraulic chambers by the gas spring piston.

\* \* \* \* \*